(12) United States Patent
Huang et al.

(10) Patent No.: US 7,746,115 B2
(45) Date of Patent: Jun. 29, 2010

(54) DATA TRANSFER CABLE FOR PROGRAMMABLE LOGIC DEVICES

(75) Inventors: Chung-Chi Huang, Taipei Hsien (TW); Guang-Dong Yuan, Shenzhen (CN); Jian-Chun Pan, Shenzhen (CN); De-Jun Zeng, Shenzhen (CN); Wei-Min Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/205,927

(22) Filed: Sep. 8, 2008

(65) Prior Publication Data

US 2009/0237112 A1 Sep. 24, 2009

(30) Foreign Application Priority Data

Mar. 21, 2008 (CN) .......................... 2008 1 0300665

(51) Int. Cl.
*H03K 19/0175* (2006.01)
*H03K 19/094* (2006.01)

(52) U.S. Cl. .............................. 326/83; 326/82; 341/95; 341/101

(58) Field of Classification Search ................... 326/82, 326/83, 16; 341/95, 100, 101
See application file for complete search history.

(56) References Cited

U.S. PATENT DOCUMENTS 5,694,399 A * 12/1997 Jacobson et al. ............. 709/246
6,184,808 B1 * 2/2001 Nakamura .................... 341/95

* cited by examiner

*Primary Examiner*—Daniel D Chang
(74) *Attorney, Agent, or Firm*—Zhigang Ma

(57) ABSTRACT

A programmable logic device (PLD) data transfer cable includes a parallel interface, a programming interface, and a logic control circuit. The parallel interface is used for connecting to PLDs. The logic control circuit includes a first group of transmission channels, a second group of transmission channels, a first group of switches, and a second group of switches. The first and second group of switches control the working status of the first and second group of transmission channels respectively. The electrical connections between pins of the parallel interface and the programming interface when first group of transmission channels are activated are different with those when second group of transmission channels are activated.

11 Claims, 3 Drawing Sheets

DATA TRANSFER CABLE FOR PROGRAMMABLE LOGIC DEVICES

BACKGROUND

1. Field of the Invention

The present invention relates to a data transfer cable and, particularly, to a data transfer cable for programmable logic devices.

2. Description of the Related Art

When a programmable logic device (PLD) is programmed in-system, a data transfer cable is used for connecting a computer parallel interface with a programming interface of the PLD. The specifications of different PLDs are not the same. Thus, the data transfer cable must be changed for programming different PLDs, which increases cost and is inconvenient.

What is needed, therefore, is to provide a data transfer cable for PLDs which can amend the aforementioned deficiencies.

DETAILED DESCRIPTION

Figure 1:
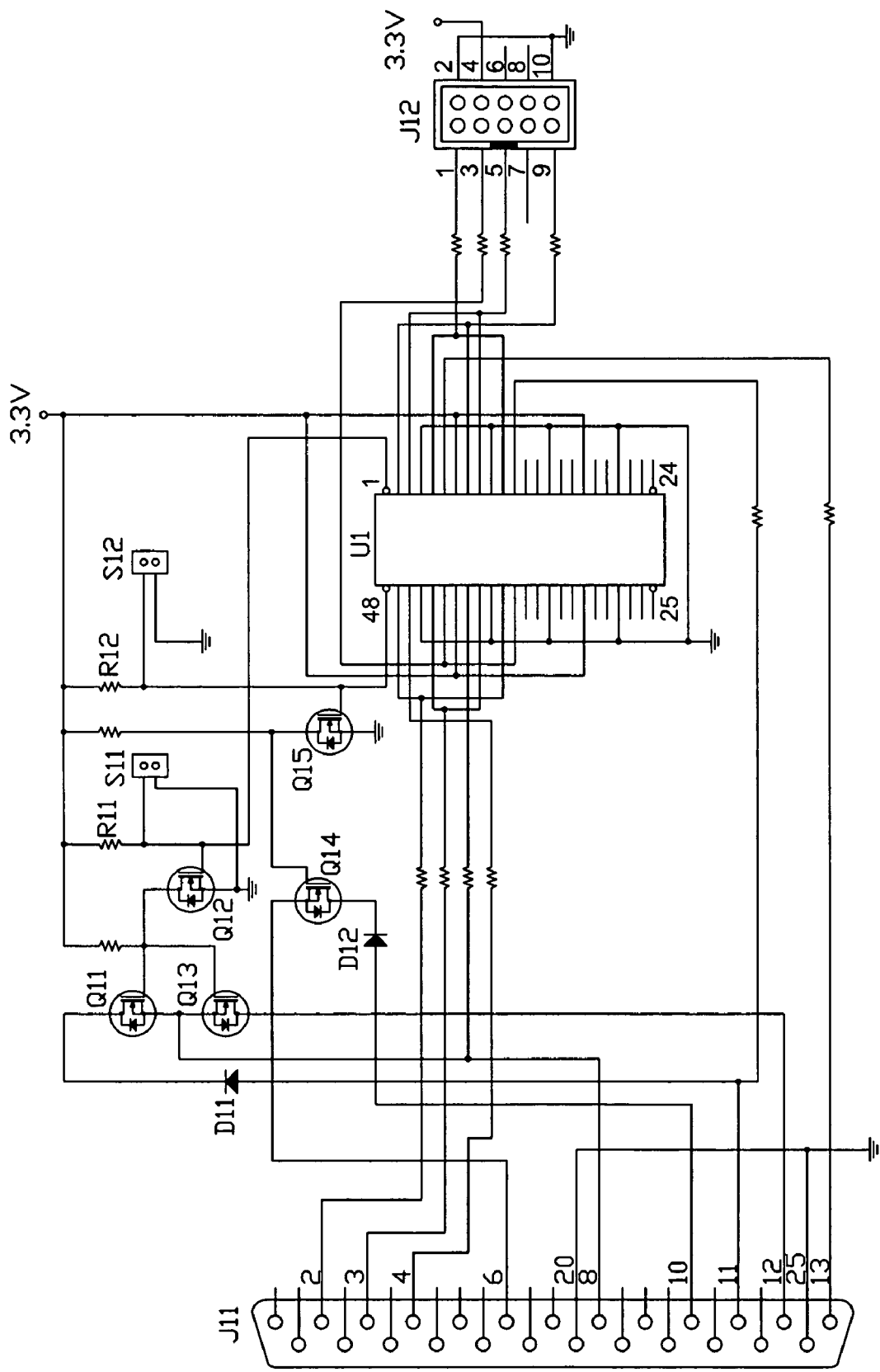
FIG. 1 is a circuit diagram of a data transfer cable for PLDs in accordance with a first embodiment of the present invention.

Referring to FIG. 1, a data transfer cable for PLDs in accordance with a first embodiment of the present invention includes a parallel interface J11, a programming interface J12, and a logic control circuit. The parallel interface J11 is used for connecting to a computer. The programming interface J12 is used for connecting to complex programmable logic devices (CPLDs) or field programmable gate arrays (FPGAs). The logic control circuit includes five N-Channel metal oxide semiconductor field effect transistors (MOSFETs) Q11 to Q15, two switches S11 and S12, two diodes D11 and D12, and a chip U1. In this embodiment, the parallel interface J11 is a 25-pin printer interface. The programming interface J12 is a 10-pin joint test action group (JTAG) interface. The chip U1 is a SN74LVC16244A type chip, which includes 48 pins. The definition of each pin of the chip U1 can be found in Table 1. In FIG. 1, the right side pins of the chip U1 are sequentially arranged downwards, and the left side pins of the chip U1 are sequentially arranged upwards. Therefore, the first pin 1 of the chip U1 is the most top one on the right side of the chip U1, and the forty-eighth pin of the chip U1 is the most top one on the left side of the chip U1. Please refer to both FIG. 1 and Table 1 for the following description about the pins of the chip U1.

A second pin of the parallel interface J11 is connected to pins 1A1 and 2A3 of the chip U1. A third pin of the parallel interface J11 is connected to pins 1A3 and 2A2 of the chip U1. A fourth pin and a sixth pin of the parallel interface J11 are connected to a pin 1A2 of the chip U1 and a source of the N-Channel MOSFET Q14 respectively. An eighth pin of the parallel interface J11 is connected to a source of the N-Channel MOSFET Q13 and a pin 2A1 of the chip U1. A tenth pin of the parallel interface J11 is connected to a positive terminal of the diode D12. An eleventh pin of the parallel interface J11 is connected to a positive terminal of the diode D11 and a pin 2Y4 of the chip U1. A twelfth pin and a thirteenth pin of the parallel interface J11 are connected to a drain of the N-Channel MOSFET Q13 and a pin 1Y4 of the chip U1 respectively. A twentieth pin and a twenty-fifth pin of the parallel interface J11 are grounded.

TABLE 1

| 1st | 2nd | 3rd | 4th | 5th | 6th | 7th | 8th | 9th | 10th | 11th | 12th |
| --- | --- | --- | --- | --- | --- | --- | --- | --- | --- | --- | --- |
| 1G | 1Y1 | 1Y2 | GND | 1Y3 | 1Y4 | VCC | 2Y1 | 2Y2 | GND | 2Y3 | 2Y4 |
| 13th | 14th | 15th | 16th | 17th | 18th | 19th | 20th | 21st | 22nd | 23rd | 24th |
| 3Y1 | 3Y2 | GND | 3Y3 | 3Y4 | VCC | 4Y1 | 4Y2 | GND | 4Y3 | 4Y4 | 4G |
| 25th | 26th | 27th | 28th | 29th | 30th | 31st | 32nd | 33rd | 34th | 35th | 36th |
| 3G | 4A4 | 4A3 | GND | 4A2 | 4A1 | VCC | 3A4 | 3A3 | GND | 3A2 | 3A1 |
| 37th | 38th | 39th | 40th | 41st | 42nd | 43rd | 44th | 45th | 46th | 47th | 48th |
| 2A4 | 2A3 | GND | 2A2 | 2A1 | VCC | 1A4 | 1A3 | GND | 1A2 | 1A1 | 2G |

A drain, a source and a gate of the N-Channel MOSFET Q11 are connected to a negative terminal of the diode D11, the source of the N-Channel MOSFET Q13, and a 3.3V power source respectively. A drain and a source of the N-Channel MOSFET Q12 are connected to the 3.3V power source and ground respectively. A gate of the N-Channel MOSFET Q12 is connected to the 3.3V power source through a resistor R11, and is grounded via the switch S11. A gate of the N-Channel MOSFET Q13 is connected to the 3.3V power source. A drain and a gate of the N-Channel MOSFET Q14 are connected to a negative terminal of the diode D12, and the 3.3V power source respectively. A drain and a source of the N-Channel MOSFET Q15 are connected to the 3.3V power source and ground respectively. A gate of the N-Channel MOSFET Q15 is connected to the 3.3V power source through a resistor R12, and is grounded via the switch S12. The gate of the N-Channel MOSFET Q15 is further connected to the pin 2G of the chip U1. The switches S11 and S12 are connected to the 3.3V power source through the resistors R11 and R12 respectively.

All power pins VCC of the chip U1 are connected to the 3.3V power source. All ground pins GND of the chip U1 are grounded. Pins 1A4 and 2A4 of the chip U1 are connected to a third pin of the programming interface J12. Pins 1Y1 and 2Y1 of the chip U1 are connected to a ninth pin of the programming interface J12. Pins 1Y2 and 2Y2 of the chip U1 are connected to a fifth pin of the programming interface J12. Pins 1Y3 and 2Y3 of the chip U1 are connected to a first pin of the programming interface J12. A fourth pin of the programming J12 is connected to the 3.3V power source. A second pin and a tenth pin of the programming interface J12 are grounded.

When the switch S11 is closed, and the switch S12 is opened, the N-Channel MOSFETs Q12 and Q14 turn off, and the N-Channel MOSFETs Q11, Q13, and Q15 turn on. The pin 1G of the chip U1 is grounded via the switch S11, and serves as the enable pin to activate first group of transmission channels of the chip U1. Pins 1A1, 1A2, 1A3, and 1A4 of the chip U1 are electrically connected to the pins 1Y1, 1Y2, 1Y3, and 1Y4 respectively. Thus, the second, fourth, third, and thirteenth pins of the parallel interface J11 are electrically connected to the ninth, fifth, first, and third pins of the programming interface J12 respectively. The data transfer cable for PLDs can be used to program a first type of CPLDs/FPGAs.

When the switch S11 is opened, and the switch S12 is closed, the N-Channel MOSFETs Q12 and Q14 turn on. The N-Channel MOSFETs Q11, Q13, and Q15 turn off. A pin 2G of the chip U1 is grounded via the switch S12 and servers as the enable pin to activate second group of transmission channels of the chip U1. Pins 2A1, 2A2, 2A3, and 2A4 of the chip U1 are electrically connected to pins 2Y1, 2Y2, 2Y3, and 2Y4 respectively. Thus, the eighth, third, second, and eleventh pins of the parallel interface J11 are electrically connected to the ninth, fifth, first, and third pins of the programming interface J12. The data transfer cable for PLDs can be used to program a second type of CPLDs/FPGAs.

In this embodiment, the diodes D11 and D12 are used for insulating the interference from the N-Channel MOSFETs Q11 to Q14. The N-Channel MOSFETs Q11 to Q15 can be also other types of electrical switches. The data transfer cable for PLDs in accordance with the first embodiment of the present invention is compatible with two types of CPLDs/FPGAs through selectively opening the switches S11 and S12.

Figure 2:
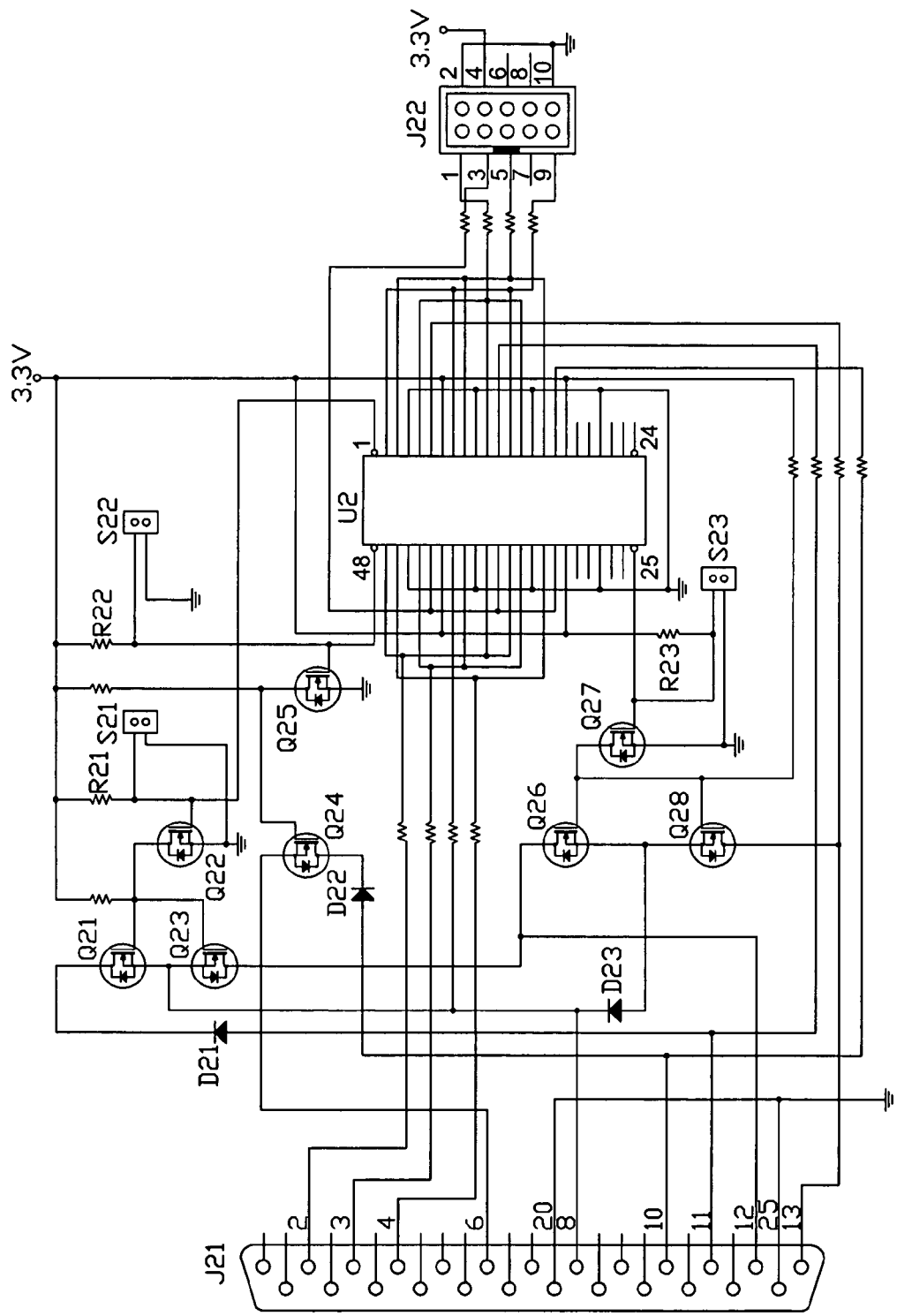
FIG. 2 is a circuit diagram of a data transfer cable for PLDs in accordance with a second embodiment of the present invention.

Referring to FIG. 2, a data transfer cable for PLDs in accordance with the second embodiment of the present invention includes a parallel interface J21, a programming interface J22, and a logic control circuit. The parallel interface J21 is used for connecting to a computer. The programming interface J22 is used for connecting to CPLDs or FPGAs. The logic control circuit includes eight N-Channel MOSFETs Q21 to Q28, three switches S21 to S23, three diodes D21 to D23, and a chip U2. In this embodiment, the connection among the parallel interface J21, the programming interface J22, the N-Channel MOSFETs Q21 to Q25, the diodes D21 to D22, the chip U2, and the switches S21 to S22 are similar to the connections among the parallel interface J11, the programming interface J12, the N-Channel MOSFETs Q11 to Q15, the diodes D11 to D12, the chip U1, and the switches S11 to S12 in the first embodiment. The definition of each pin of the chip U2 is similar to that of the chip U1, and can be found in Table 1. Please refer to both FIG. 2 and Table 1 for the following description about the pins of the chip U2.

The difference between the connections in the first embodiment and those in the second embodiments are as follows: the second, third, fourth, and tenth pins of the parallel interface J21 are further connected to the pins 3A1, 3A2, 3A3, and 3Y4 of the chip U2 respectively the eighth, twelfth, and thirteenth pins of the parallel interface J21 are further connected to a negative terminal of the diode D23, a drain of the N-Channel MOSFET Q26, and a drain of the N-Channel MOSFET Q28 respectively. Sources of the N-Channel MOSFETs Q26 and Q28 are connected to a positive terminal of the diode D23. Gates of the N-Channel MOSFETs Q26 and Q28 are connected to a drain of the N-Channel MOSFET Q27 which is connected to the 3.3V power source. A gate of the N-Channel MOSFET Q27 is connected to the 3.3V power source through a resistor R23, the pin 3G of the chip U2, and is grounded via the switch S23. A source of the N-Channel MOSFET Q27 is grounded. The pins 3A4, 3Y1, 3Y2, and 3Y3 of the chip U2 are connected to the third, ninth, first, and fifth pins of the programming interface J22 respectively. The switches S21, S22, and S23 are connected to the 3.3V power source through resistors R21, R22, and R23 respectively.

When the switch S21 is closed, and the switches S22 and S23 are opened, the N-Channel MOSFETs Q22, Q24, Q26, and Q28 turn off, and the N-Channel MOSFETs Q21, Q23, Q25, and Q27 turn on. The pin 1G of the chip U2 is grounded via the switch S21, and servers as the enable pin to activate first group of transmission channels of the chip U2. The pins 1A1, 1A2, 1A3, and 1A4 of the chip U2 are electrically connected to the pins 1Y1, 1Y2, 1Y3, and 1Y4 respectively. Thus, the second, fourth, third, and thirteenth pins of the parallel interface J21 are electrically connected to the ninth, fifth, first, and third pins of the programming interface J22. The data transfer cable for PLDs can be used to program the first type of CPLDs/FPGAs.

When the switches S21 and S23 are opened, and the switch S22 is closed, the N-Channel MOSFETs Q22, Q24, and Q27 turn on. The N-Channel MOSFETs Q21, Q23, Q25, Q26, and Q28 turn off. The pin 2G of the chip U2 is grounded via the switch S22, and servers as the enable pin to activate a second group of transmission channels of the chip U2. The pins 2A1, 2A2, 2A3, and 2A4 of the chip U2 are electrically connected to the pins 2Y1, 2Y2, 2Y3, and 2Y4 respectively. Thus, the eighth, third, second, and eleventh pins of the parallel interface J21 are electrically connected to the ninth, fifth, first, and third pins of the programming interface J22 respectively. The data transfer cable for PLDs can be used to program the second type of CPLDs/FPGAs.

When the switches S21 and S22 are opened, and the switch S23 is closed, the N-Channel MOSFETs Q22, Q25, Q26, and Q28 turn on, and the N-Channel MOSFETs Q21, Q23, Q24, and Q27 turn off. The pin 3G of the chip U2 is grounded via the switch S23, and servers as the enable pin to activate a third group of transmission channels of the chip U2. The pins 3A1, 3A2, 3A3, and 3A4 of the chip U2 are electrically connected to the pins 3Y1, 3Y2, 3Y3, and 3Y4 respectively. Thus, the second, third, fourth and tenth pins of the parallel interface J21 are electrically connected to the ninth, first, fifth, and third pins of the programming interface J22 respectively. The data transfer cable for PLDs can be used to program a third type of CPLDs/FPGAs.

Figure 3:
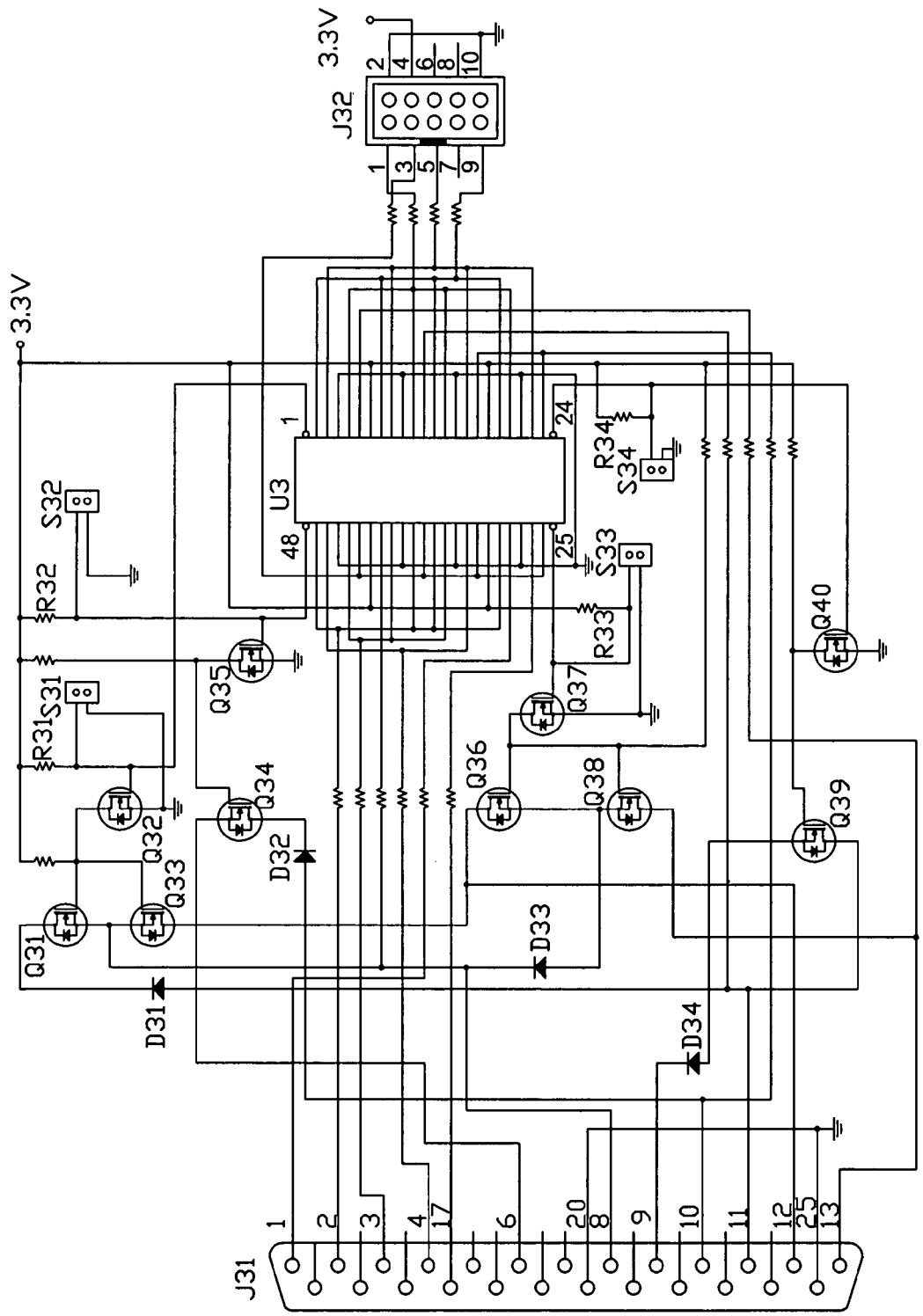
FIG. 3 is a circuit diagram of a data transfer cable for PLDs in accordance with a third embodiment of the present invention.

Referring to FIG. 3, a data transfer cable for PLDs in accordance with the third embodiment of the present invention includes a parallel interface J31, a programming interface J32, and a logic control circuit. The parallel interface J31 is used for connecting to a computer. The programming interface J32 is used for connecting to PLDs. The logic control circuit includes ten N-Channel MOSFETs Q31 to Q40, four switches S31 to S34, four diodes D31 to D34, and a chip U3. In this embodiment, the connections among the parallel interface J31, the programming interface J32, the N-Channel MOSFETs Q31 to Q38, the diodes D31 to D33, the chip U3, and the switches S31 to S33 are similar to the connections among the parallel interface J21, the programming interface J22, the N-Channel MOSFETs Q21 to Q28, the diodes D21 to D23, the chip U2, and the switches S21 to S23. The definition of each pin of the chip U3 is similar to that of the chip U1, and can be found in Table 1. Please refer to both FIG. 3 and Table 1 for the following description about the pins of the chip U3.

The difference between the connections in the second embodiment and those in the third embodiment are as follows: the first, second, tenth, and seventeenth pins of the parallel interface J31 are further connected to the pins 4A2, 4A1, 4Y4, and 4A3 of the chip U2 respectively the ninth and eleventh pins of the parallel interface J21 are further connected to a negative terminal of the diode D34, and a drain of the N-Channel MOSFET Q39 respectively. A source of the N-Channel MOSFET Q39 is connected to a positive terminal of the diode D34. A gate of the N-Channel MOSFET Q39 and a drain of the N-Channel MOSFET Q40 are connected to the 3.3V power source, and are grounded via the switch S34. A source of the N-Channel MOSFET Q40 is grounded. A gate of the N-Channel MOSFET Q40 is connected to the pin 4G of the chip U3, and is grounded via the switch S34. The pins 4A4, 4Y1, 4Y2, and 4Y3 of the chip U3 are connected to the third, ninth, first, and fifth pins of the programming interface J22 respectively. The switches S31 to S34 are connected to the 3.3V power source through resistors R31 to R34 respectively.

When the switch S31 is closed, and the switches S32 to S34 are opened, the N-Channel MOSFETs Q32, Q34, Q36, Q38, and Q39 turn off. The N-Channel MOSFETs Q31, Q33, Q35, Q37, and Q40 turn on. The pin 1G of the chip U3 is grounded via the switch S31, and servers as the enable pin to activate a first group of transmission channels of the chip U3. The pins 1A1, 1A2, 1A3, and 1A4 of the chip U3 are electrically connected to the pins 1Y1, 1Y2, 1Y3, and 1Y4 respectively. Thus, the second, fourth, third, and thirteenth pins of the parallel interface J31 are electrically connected to the ninth, fifth, first, and third pins of the programming interface J32 respectively. The data transfer cable for PLDs can be used to program the first type of CPLDs/FPGAs.

When the switches S31, S33, and S34 are opened, and the switch S32 is closed, the N-Channel MOSFETs Q32, Q34, Q37, and Q40 turn on. The N-Channel MOSFETs Q31, Q33, Q35, Q36, Q38, and Q39 turn off. The pin 2G of the chip U3 is grounded via the switch S32, and servers as the enable pin to activate a second group of transmission channels of the chip U3. The pins 2A1, 2A2, 2A3, and 2A4 of the chip U3 are electrically connected to the pins 2Y1, 2Y2, 2Y3, and 2Y4 respectively. Thus, the eighth, third, second, and eleventh pins of the parallel interface J31 are electrically connected to the ninth, fifth, first, and third pins of the programming interface J32 respectively. The data transfer cable for PLDs can be used to program the second type of CPLDs/FPGAs.

When the switches S31, S32, and S34 are opened, and the switch S33 is closed, the N-Channel MOSFETs Q32, Q35, Q36, Q38, and Q40 turn on, and the N-Channel MOSFETs Q31, Q33, Q34, Q37, and Q39 turn off. The pin 3G of the chip U3 is grounded via the switch S33, and servers as the enable pin to activate a third group of transmission channels of the chip U3. Pins 3A1, 3A2, 3A3, and 3A4 of the chip U3 are electrically connected to pins 3Y1, 3Y2, 3Y3, and 3Y4 respectively. Thus, the second, fourth, third, and tenth pins of the parallel interface J31 are electrically connected to the ninth, fifth, first, and third pins of the programming interface J32 respectively. The data transfer cable for PLDs can be used to program the third type of CPLDs/FPGAs.

When the switches S31 to S33 are opened, and the switch S34 are closed, the N-Channel MOSFETs Q33, Q35, Q37, and Q39 turn on, and the N-Channel MOSFETs Q31, Q32, Q34, Q36, Q38, and Q40 turn off. The pin 4G of the chip U3 is grounded via the switch J34, and servers as the enable pin to activate a fourth group of transmission channels of the chip U3. Pins 4A1, 4A2, 4A3, and 4A4 of the chip U3 are electrically connected to pins 4Y1, 4Y2, 4Y3, and 4Y4 respectively. Thus, the second, first, seventeenth, and tenth pins of the parallel interface J31 are electrically connected to the ninth, first, fifth, and third pins of the programming interface J32 respectively. The data transfer cable for PLDs can be used to program a fourth type of CPLDs/FPGAs.

The foregoing description of the exemplary embodiments of the invention has been presented only for the purposes of illustration and description and is not intended to be exhaustive or to limit the invention to the precise forms disclosed. Many modifications and variations are possible in light of the above everything. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A data transfer cable for a programmable logic device (PLD) comprising:
   a parallel interface;
   a programming interface capable of connecting to a PLD; and
   a logic control circuit connected to the parallel interface and the programming interface, comprising a first group of transmission channels, a second group of transmission channels, a first group of switches controlling the working status of the first group of transmission channels, and a second group of switches controlling the working status of the second group of transmission channels;
   wherein the parallel interface is a 25-pin printer interface, a second, fourth, third, and thirteenth pins of the parallel interface are electrically connected to four pins of the programming interface respectively when the first group of transmission channels are activated; an eighth, third, second and eleventh pins of the parallel interface are connected to four pins of the programming interface respectively when the second group of transmission channels are activated.

2. The data transfer cable for a PLD as claimed in claim 1, wherein the programming interface is a 10-pin joint test action group interface.

3. The data transfer cable for a PLD as claimed in claim 2, wherein the second, fourth, third, and thirteenth pins of the parallel interface are electrically connected to a ninth, fifth, first, and third pins of the programming interface respectively when the first group of transmission channels are activated; the eighth, third, second and eleventh pins of the parallel interface are connected to the ninth, fifth, first, and third pins of the programming interface respectively when the second group of transmission channels are activated.

4. The data transfer cable for a PLD as claimed in claim 3, wherein the first and second group of transmission channels are placed in a chip; the first group of switches comprise a first N-Channel metal oxide semiconductor field effect transistor (MOSFET), a second N-Channel MOSFET, a third N-Channel MOSFET, a first diode, and a first switch; the second group of switches comprise a fourth N-Channel MOSFET, a fifth N-Channel MOSFET, a second diode, and a second switch; the chip comprises a first enable pin, a second enable pin, first to eight input pins, and first to eight output pins; the first group of transmission channels comprise the first to fourth input pins, the first to fourth output pins; the first enable pin is configured to control the connection between the first input pin and the first output pin, the connection between the second input pin and the second output pin, the connection between the third input pin and the third output pin, and the connection between the fourth input pin and the fourth output pin; a second pin of the parallel interface is connected to the first and seventh input pins of the chip; a third pin of the parallel interface is connected to the third and sixth input pins of the chip; a fourth pin of the parallel interface is connected to the second input pin of the chip; a sixth pin of the parallel interface is connected to a source of the fourth N-Channel MOSFET; an eighth pin of the parallel interface is connected to a source of the third N-Channel MOSFET and the fifth input pin of the chip; a tenth pin of the parallel interface is connected to a positive terminal of the second diode; an eleventh pin of the parallel interface is connected to a positive terminal of the first diode and the eighth output pin of the chip; a twelfth pin of the parallel interface is connected to a drain of the third N-Channel MOSFET; a thirteenth pin of the parallel interface is connected to the fourth output pin of the chip; a drain, a source and a gate of the first N-Channel MOSFET are connected to a negative terminal of the first diode, the source of the third N-Channel MOSFET, and a power source respectively; a drain and a source of the second N-Channel MOSFET are connected to the power source and ground respectively; a gate of the second N-Channel MOSFET is connected to the power source and is grounded through the first switch; a gate of the third N-Channel MOSFET is connected to the power source; a drain and a gate of the fourth N-Channel MOSFET are connected to a negative terminal of the second diode, and the power source respectively; a drain and a source of the fifth N-Channel MOSFET are connected to the power source and ground respectively; a gate of the fifth N-Channel MOSFET is connected to the power source, and is grounded through the second switch; a gate of the fifth N-Channel MOSFET is further connected to the second enable pin of the chip; the fourth and eighth input pins of the chip are connected to the third pin of the programming interface; the first and fifth output pins of the chip are connected to the ninth pin of the programming interface; the second and sixth output pins of the chip are connected to the fifth pin of the programming interface; the third and seventh output pins of the chip are connected to the first pin of the programming interface; the first and second switches are connected to the power source through a first resistor and a second resistor respectively.

5. The data transfer cable for a PLD as claimed in claim 4, wherein the logic control circuit further comprises a third group of transmission channels and a third group of switches capable of controlling the working status of the third group of transmission channels; the second, fourth, third, and tenth pins of the parallel interface are connected to the ninth, fifth, first, and third pins of the programming interface respectively when the third group of transmission channels are activated.

6. The data transfer cable for a PLD as claimed in claim 5, wherein the third group of transmission channels is placed in the chip; the third group of switches comprise a sixth N-Channel MOSFET, a seventh N-Channel MOSFET, an eighth N-Channel MOSFET, a third diode, and a third switch; the chip comprises a ninth to twelfth input pins, a ninth to twelfth output pins, and a third enable pin; the third group of transmission channels comprise the ninth to twelfth input pins, the ninth to twelfth output pins; the third enable pin is configured to control the connection between the ninth input pin and the ninth output pin, the connection between the tenth input pin and the tenth output pin, the connection between the eleventh input pin and the eleventh output pin, and the connection between the twelfth input pin and the twelfth output pin; the second, third, fourth, and tenth pins of the parallel interface are further connected to the ninth input pin, the tenth input pin, the eleventh input pin, and the twelfth output pin of the chip respectively; the eighth, twelfth, and thirteenth pins of the parallel interface are further connected to a negative terminal of the third diode, a drain of the sixth N-Channel MOSFET, and a drain of the eighth N-Channel MOSFET respectively; sources of the sixth and eighth N-Channel MOSFETs are connected to a positive terminal of the third diode; gates of the sixth and eighth N-Channel MOSFETs are connected to a drain of the seventh N-Channel MOSFET which is connected to the power source; a gate of the seventh N-Channel MOSFET is connected to the power source, the third enable pin of the chip, and is grounded through the third switch; a source of the seventh N-Channel MOSFET is grounded; the twelfth input pin, the ninth output pin, the tenth output pin, and the eleventh output pin are connected to the third, ninth, first, and fifth pins of the programming interface respectively; the third switch is connected to the power source through a third resistor.

7. The data transfer cable for a PLD as claimed in claim 6, wherein the logic control circuit further comprises a fourth group of transmission channels and a fourth group of switches capable of controlling the working status of the fourth group of transmission channels; the second, first, seventeenth, and tenth pins of the parallel interface are connected to the ninth, first, fifth, and third pins of the programming interface respectively when the fourth group of transmission channels are activated.

8. The data transfer cable for a PLD as claimed in claim 7, wherein the fourth group of transmission channels are placed in the chip; the fourth group of switches comprise a ninth N-Channel MOSFET, a tenth N-Channel MOSFET, a fourth diode, and a fourth switch; the chip further comprises a thirteenth to sixteenth input pins, a thirteenth to sixteenth output pins, and a fourth enable pin; the fourth group of transmission channels comprise the thirteenth to sixteenth input pins, the thirteenth to sixteenth output pins; the fourth enable pin is configured to control the connection between the thirteenth input pin and the thirteenth output pin, the connection between the fourteenth input pin and the fourteenth output pin, the connection between the fifteenth input pin and the fifteenth output pin, the connection between the sixteenth input pin and the sixteenth output pin; the first, second, tenth, and seventeenth pins of the parallel interface are further connected to the fourteenth input pin, the thirteenth input pin, the sixteenth output pin, and the fifteenth input pin of the chip respectively; the ninth and eleventh pins of the parallel interface are further connected to a negative terminal of the fourth diode, and a drain of the ninth N-Channel MOSFET respectively; a source of the ninth N-Channel MOSFET is connected to a positive terminal of the fourth diode; a gate of the ninth N-Channel MOSFET and a drain of the tenth N-Channel MOSFET are connected to the power source, and are grounded through the fourth Switch; a source of the tenth N-Channel MOSFET is grounded; a gate of the tenth N-Channel MOSFET is connected to the fourth enable pin of the chip, and is grounded through the fourth switch; the sixteenth input pin, the thirteenth output pin, the fourteenth output pin, and the fifteenth output pin are connected to the third, ninth, first, and fifth pins of the programming interface respectively; the fourth switch is connected to the power source through a fourth resistor.

9. The data transfer cable for a PLD as claimed in claim 2, wherein the second, fourth, third, and thirteenth pins of the parallel interface are electrically connected to the ninth, fifth, first, and third pins of the programming interface respectively when the first group of transmission channels of the logic device are activated; the second, fourth, third, and tenth pins of the parallel interface are electrically connected to the ninth, fifth, first, and third pins of the programming interface respectively when the second group of transmission channels of the logic device are activated.

10. The data transfer cable for a PLD as claimed in claim 9, wherein the logic control circuit further comprises a third group of transmission channels and a third group of switches controlling the working status of the third group of transmission channels; the second, first, seventeenth, and tenth pins of the parallel interface are connected to the ninth, first, fifth, and third pins of the programming interface respectively when the third group of transmission channels are activated.

11. A data transfer cable for a programmable logic device (PLD) comprising:
   a parallel interface;
   a programming interface capable of connecting to a PLD; and
   a logic control circuit connected to the parallel interface and the programming interface, comprising a first group of transmission channels, a second group of transmission channels, a first group of switches controlling the working status of the first group of transmission channels, and a second group of switches controlling the working status of the second group of transmission channels;
   wherein connections between pins of the parallel interface and pins of the programming interface when the first group of transmission channels are activated are different from those when the second group of transmission channels are activated, and wherein the parallel interface is a 25-pin printer interface, and the programming interface is a 10-pin joint test action group interface.

\* \* \* \* \*